United States Patent
Park et al.

(10) Patent No.: US 8,953,535 B2
(45) Date of Patent: Feb. 10, 2015

(54) METHOD AND APPARATUS FOR TRANSCEIVING DATA VIA A CONTENTION-BASED PHYSICAL UPLINK DATA CHANNEL

(75) Inventors: Kyu Jin Park, Anyang-si (KR); Seung Hee Han, Anyang-si (KR); Sung Ho Moon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 267 days.

(21) Appl. No.: 13/512,857

(22) PCT Filed: Dec. 1, 2010

(86) PCT No.: PCT/KR2010/008561
§ 371 (c)(1),
(2), (4) Date: May 30, 2012

(87) PCT Pub. No.: WO2011/068358
PCT Pub. Date: Jun. 9, 2011

(65) Prior Publication Data
US 2012/0236816 A1  Sep. 20, 2012

Related U.S. Application Data

(60) Provisional application No. 61/265,749, filed on Dec. 1, 2009.

(30) Foreign Application Priority Data

Dec. 1, 2010  (KR) .................. 10-2010-0121594

(51) Int. Cl.
*H04W 72/04* (2009.01)
*H04W 74/08* (2009.01)

(52) U.S. Cl.
CPC .............. *H04W 74/08* (2013.01); *H04W 72/04* (2013.01)
USPC ............................ 370/329; 370/458; 370/447

(58) Field of Classification Search
None
See application file for complete search history.

(56) References Cited

U.S. PATENT DOCUMENTS 7,876,774 B2 *  1/2011  Zangi ............................ 370/461
8,078,170 B2 * 12/2011  Phan et al. .................... 455/436
8,477,695 B2 *  7/2013  Zhang .......................... 370/329

(Continued)

FOREIGN PATENT DOCUMENTS

KR  10-2008-0004416  1/2008
KR  10-0917209  9/2009

*Primary Examiner* — Hassan Kizou
*Assistant Examiner* — Hashim Bhatti
(74) *Attorney, Agent, or Firm* — Lee, Hong, Degerman, Kang & Waimey

(57) ABSTRACT

Disclosed are a method and apparatus for transceiving data via a contention based physical uplink data channel. A terminal apparatus, which transmits data via a contention based physical uplink data channel, comprises: a transmitter which transmits data via a contention based physical uplink data channel and scheduling request information via a scheduling request channel simultaneously or consecutively to a base station; a receiver which receives a physical hybrid-ARQ indicator channel (PHICH) or an uplink (UL) grant message from the base station; and a processor which decodes the physical hybrid-ARQ indicator channel (PHICH) or the uplink (UL) grant message to determine whether an ACK signal or a NACK signal is indicated. Here, the scheduling request channel can be a specific channel allocated to the terminal apparatus so as to discriminate the terminal from other terminal apparatuses.

12 Claims, 6 Drawing Sheets

(56) References Cited

U.S. PATENT DOCUMENTS

| | | | |
|---|---|---|---|
| 2007/0184865 A1* | 8/2007 | Phan et al. | 455/509 |
| 2007/0201397 A1* | 8/2007 | Zhang | 370/329 |
| 2008/0075109 A1* | 3/2008 | Zangi | 370/458 |
| 2008/0310356 A1* | 12/2008 | Cai et al. | 370/329 |
| 2009/0103483 A1* | 4/2009 | Higuchi et al. | 370/329 |
| 2009/0103558 A1* | 4/2009 | Zangi et al. | 370/447 |
| 2009/0109937 A1* | 4/2009 | Cave et al. | 370/336 |
| 2009/0116434 A1 | 5/2009 | Lohr et al. | |
| 2009/0190534 A1* | 7/2009 | Yamada et al. | 370/328 |
| 2009/0207771 A1* | 8/2009 | Lindskog et al. | 370/312 |
| 2009/0303937 A1* | 12/2009 | Sawahashi et al. | 370/329 |
| 2010/0054145 A1* | 3/2010 | Frenger et al. | 370/252 |
| 2010/0098043 A1* | 4/2010 | Hafeez et al. | 370/342 |
| 2011/0039568 A1* | 2/2011 | Zhang et al. | 455/452.1 |
| 2011/0164545 A1* | 7/2011 | Koo et al. | 370/312 |
| 2012/0182977 A1* | 7/2012 | Hooli et al. | 370/336 |
| 2013/0044714 A1* | 2/2013 | Kotecha et al. | 370/329 |
| 2013/0286988 A1* | 10/2013 | Zhang | 370/329 |

* cited by examiner (a)

(b)

(a)

(b)

METHOD AND APPARATUS FOR TRANSCEIVING DATA VIA A CONTENTION-BASED PHYSICAL UPLINK DATA CHANNEL

CROSS-REFERENCE TO RELATED APPLICATIONS

This application is the National Stage filing under 35 U.S.C. 371 of International Application No. PCT/KR2010/008561, filed on Dec. 1, 2010, which claims the benefit of earlier filing date and right of priority to Korean Application No. 10-2010-0121594, filed on Dec. 1, 2010, and also claims the benefit of U.S. Provisional Application Ser. No. 61/265,749, filed on Dec. 1, 2009, the contents of which are all incorporated by reference herein in their entirety.

TECHNICAL FIELD

The present invention relates to wireless communication, and more particularly, to a method for transmitting and receiving data through a contention based physical uplink data channel and an apparatus for the same.

BACKGROUND ART

A $3^{rd}$ generation partnership project long term evolution (3GPP LTE) or LTE-Advanced (LTE-A) communication system which is an example of a mobile communication system to which the present invention may be applied will be described in brief.

One or more cells may exist for one base station. One cell is set to one of bandwidths of 1.25, 2.5, 5, 10, and 20 MHz to provide a downlink or uplink transport service to several user equipment. Different cells may be set to provide different bandwidths. Also, one base station controls data transmission and reception for a plurality of user equipment. The base station transmits downlink (DL) scheduling information of downlink data to the corresponding user equipment to notify the user equipment of time and frequency domains to which data will be transmitted and information related to encoding, data size, hybrid automatic repeat and request (HARQ). Also, the base station transmits uplink (UL) scheduling information of uplink data to the corresponding user equipment to notify the user equipment of time and frequency domains that can be used by the corresponding user equipment, and information related to encoding, data size, and HARQ. An interface for transmitting user traffic or control traffic may be used between the base stations.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure, open type interface, proper power consumption of the user equipment, etc. are required.

Recently, standardization of advanced technology of LTE is in progress under the 3rd Generation Partnership Project (3GPP). This technology will be referred to as "LTE-Advanced" or "LTE-A." One of important differences between the LTE system and the LTE-A system is difference in system bandwidth and introduction of a relay station.

However, a method for contention based uplink data transmission of an LTE-A user equipment which is not scheduled for uplink resources from a base station in the LTE-A system has not been studied until now.

DISCLOSURE

Technical Problem

An object of the present invention devised to solve the conventional problem is to provide a method for transmitting data through a contention based physical uplink data channel.

Another object of the present invention is to provide a user equipment for transmitting data through a contention based physical uplink data channel.

Still another object of the present invention is to provide a method for receiving data through a contention based physical uplink data channel in a base station.

Further still another object of the present invention is to provide a base station for receiving data through a contention based physical uplink data channel.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, a method for transmitting data by a user equipment through a contention based physical uplink data channel comprises the steps of transmitting data through the contention based physical uplink data channel and scheduling request information through a scheduling request channel to a base station simultaneously or sequentially; and receiving ACK signal or NACK signal from the base station through a physical hybrid-ARQ indicator channel (PHICH) or uplink grant message, the ACK signal or NACK signal indicating whether the data have been successfully decoded, wherein the scheduling request channel is the channel specifically allocated to the user equipment differently from another user equipment.

The ACK signal may be transmitted through a specific indicator or a field within the uplink grant (UL grant) message, and the NACK signal may be transmitted through a specific indicator within the uplink grant (UL grant) message or a predefined ACK, NACK feedback region.

A position of a resource to which the PHICH is transmitted may be determined on the basis of one or more of a cyclic shift value of a reference signal for demodulation included in the contention based physical uplink data channel through which the one or more user equipment transmit the data and a physical resource block index to which the data are transmitted. The ACK signal or the NACK signal may be indicated by toggling of the specific indicator. The data may be transmitted through a contention based uplink data channel where frequency hopping is performed in a slot unit.

To solve the aforementioned technical problems, a method for receiving data by a base station through a contention based physical uplink data channel comprises the steps of receiving data through the contention based physical uplink data channel and scheduling request information through a scheduling request channel from one or more user equipment; and decoding the data received from the one or more user equipment transmit the scheduling request information through the contention based physical uplink data channel, wherein the scheduling request channel is the channel separately allocated to each of the one or more user equipment.

The method, if the received data are successfully decoded, further comprises the step of transmitting ACK signal to one or more user equipment which transmit the scheduling requests information, through uplink grant message including uplink resource allocation information or physical hybrid-ARQ indicator channel (PHICH). Otherwise, the method, if the received data are failed to be decoded, further comprises the step of transmitting NACK signal to one or more user equipment transmit the scheduling requests information through uplink grant message including uplink resource allocation information.

The method may further comprise the step of performing blinding detection per a predefined data transmission unit for data transmitted from the one or more user equipment which transmit the scheduling request information through the contention based physical uplink data channel. In this case, the contention based physical uplink data channel may include a plurality of data transmission units.

Also, the ACK signal may be transmitted through a specific indicator or a field within the uplink grant (UL grant) message, and the NACK signal may be transmitted through a specific indicator within the uplink grant (UL grant) message or a predefined ACK, NACK feedback region.

A position of a resource to which the PHICH is transmitted may be determined on the basis of one or more of a cyclic shift value of a reference signal for demodulation included in the contention based physical uplink data channel through which the one or more user equipment transmit the data and a physical resource block (PRB) index to which the data are transmitted.

The ACK signal or the NACK signal may be indicated by toggling of the specific indicator, and the data may be transmitted through a contention based uplink data channel where frequency hopping is performed in a slot unit.

To solve the aforementioned technical problems, a user equipment for transmitting data through a contention based physical uplink data channel comprises a transmitter for transmitting data through the contention based physical uplink data channel and scheduling request information through a scheduling request channel to a base station simultaneously or sequentially; a receiver for receiving a physical hybrid-ARQ indicator channel (PHICH) or uplink (UL) grant message from the base station; and a processor for determining whether ACK signal or NACK signal has been indicated by decoding the PHICH or the uplink grant message, wherein the scheduling request channel is the channel specifically allocated to the user equipment differently from another user equipment.

To solve the aforementioned technical problems, a base station for receiving data through a contention based physical uplink data channel comprises a receiver simultaneously or sequentially for receiving data through the contention based physical uplink data channel and scheduling request information through a scheduling request channel from one or more user equipment; and a processor for decoding the data received from the one or more user equipment transmit the scheduling request information through the contention based physical uplink data channel, wherein the scheduling request channel is the channel separately allocated to each of the one or more user equipment.

The base station, if the processor successfully decodes the received data, may further comprise a transmitter for transmitting ACK signal to one or more user equipment transmit the scheduling requests information through uplink grant message including uplink resource allocation information or physical hybrid-ARQ indicator channel (PHICH).

Otherwise, the base station, if the processor fails to decode the received data, may further comprise a transmitter for transmitting NACK signal to one or more user equipment transmit the scheduling requests information through uplink grant message including uplink resource allocation information.

The processor may perform blinding detection per a predefined data transmission unit for data transmitted from the one or more user equipment transmit the scheduling request information through the contention based physical uplink data channel.

Advantageous Effects

According to the present invention, the user equipment may efficiently transmit data before being allocated with uplink resources from the base station.

The user equipment may efficiently perform initial data transmission by using contention based uplink data channel allocation and allocation information related to the contention based uplink data channel allocation.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on a mobile communication system of a 3GPP LTE or LTE-A system, the following description may be applied to other mobile communication systems except for unique features of the 3GPP LTE or LTE-A system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Furthermore, in the following description, it is assumed that a user equipment means a mobile or fixed type user terminal such as a mobile station (MS) and an advanced mobile station (AMS). It is also assumed that a base station means a random node of a network node, such as Node B, eNode B and an access point (AP), which performs communication with a user equipment. A relay may be referred to as a rely node (RN) or a relay station (RS).

In the mobile communication system, a user equipment and a relay node may receive information from a base station through a downlink. Also, the user equipment and the relay node may transmit information through an uplink. Examples of information transmitted from and received by the user equipment and the relay node include data and various kinds of control information. Various physical channels exist depending on types of information transmitted from or received by the user equipment and the relay node.

Figure 1:
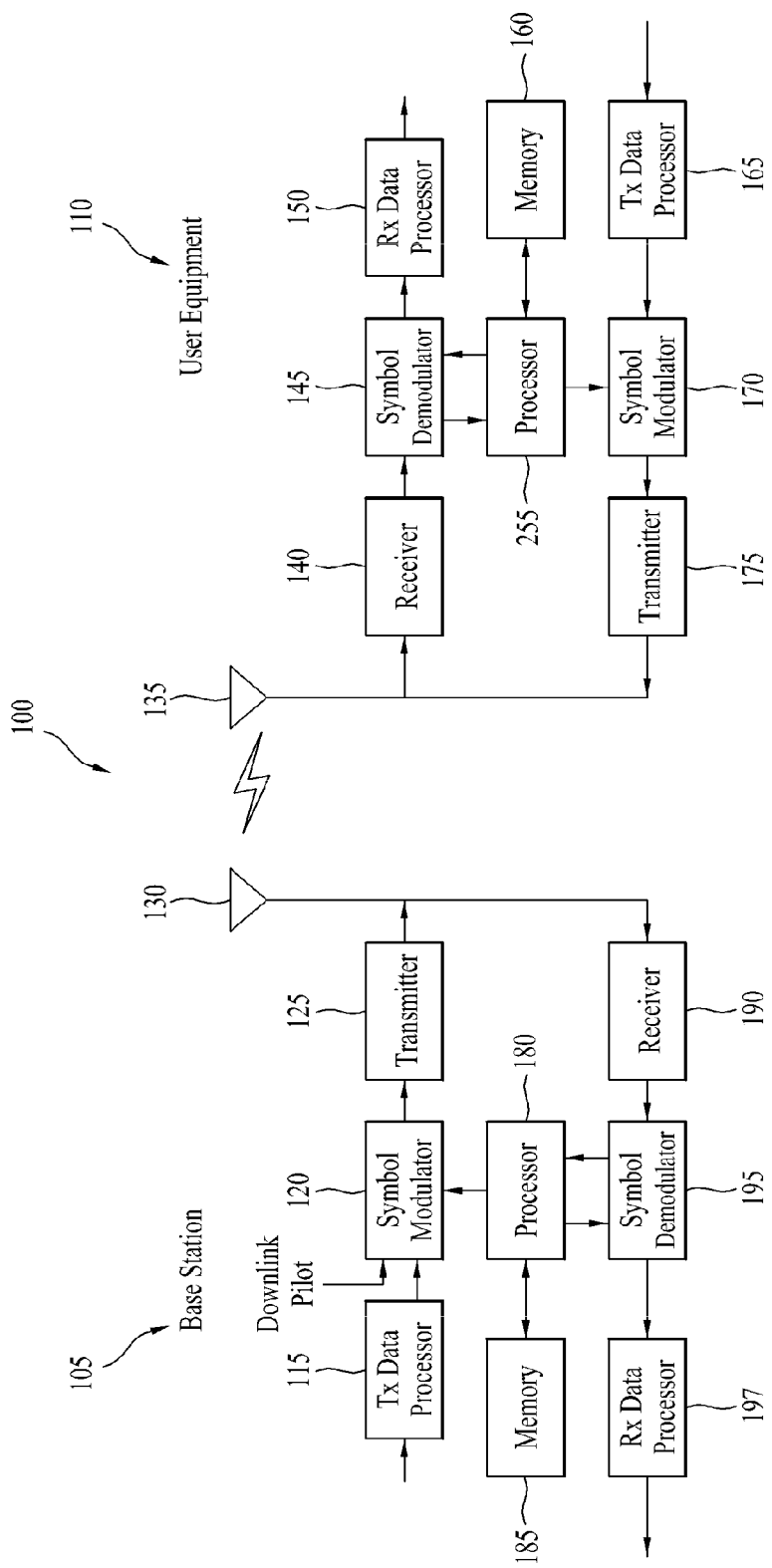
FIG. 1 is a block diagram illustrating a configuration of a base station 105 and a user equipment 110 in a wireless communication system 100.

FIG. 1 is a block diagram illustrating a configuration of a base station 105 and a user equipment 110 in a wireless communication system 100.

Although one base station 105, one user equipment 110 are shown for simplification of a wireless communication system 100, the wireless communication system 100 may include one or more base stations and/or one or more user equipment.

Referring to FIG. 1, the base station 105 may include a transmitting (Tx) data processor 115, a symbol modulator 120, a transmitter 125, a transmitting and receiving antenna 130, a processor 180, a memory 185, a receiver 190, a symbol demodulator 195, and a receiving (Rx) data processor 297. The user equipment 110 may include a Tx data processor 165, a symbol modulator 170, a transmitter 175, a transmitting and receiving antenna 135, a processor 155, a memory 160, a receiver 140, a symbol demodulator 155, and an Rx data processor 150. Although the antennas 130 and 135 are respectively shown in the base station 105 and the user equipment 110, each of the base station 105 and the user equipment 110 includes a plurality of antennas. Accordingly, the base station 105 and the user equipment 110 according to the present invention support a multiple input multiple output (MIMO) system. The base station 105 according to the present invention may support both a single user-MIMO (SU-MIMO) system and a multi user-MIMO (MU-MIMO) system.

On a downlink, the Tx data processor 115 receives traffic data, formats and codes the received traffic data, interleaves and modulates (or symbol maps) the coded traffic data, and provides the modulated symbols ("data symbols"). The symbol modulator 120 receives and processes the data symbols and pilot symbols and provides streams of the symbols.

The symbol modulator 120 multiplexes the data and pilot symbols and transmits the multiplexed data and pilot symbols to the transmitter 125. At this time, the respective transmitted symbols may be a signal value of null, the data symbols and the pilot symbols. In each symbol period, the pilot symbols may be transmitted continuously. The pilot symbols may be frequency division multiplexing (FDM) symbols, orthogonal frequency division multiplexing (OFDM) symbols, time division multiplexing (TDM) symbols, or code division multiplexing (CDM) symbols.

The transmitter 125 receives the streams of the symbols and converts the received streams into one or more analog symbols. Also, the transmitter 125 generates downlink signals suitable for transmission through a radio channel by additionally controlling (for example, amplifying, filtering and frequency upconverting) the analog signals. Subsequently, the downlink signals are transmitted to the user equipment through the antenna 130.

In the configuration of the user equipment 110, the antenna 135 receives the downlink signals from the base station 105 and provides the received signals to the receiver 140. The receiver 140 controls (for example, filters, amplifies and frequency downcoverts) the received signals and digitalizes the controlled signals to acquire samples. The symbol demodulator 145 demodulates the received pilot symbols and provides the demodulated pilot symbols to the processor 155 to perform channel estimation.

Also, the symbol demodulator 145 receives a frequency response estimation value for the downlink from the processor 155, acquires data symbol estimation values (estimation values of the transmitted data symbols) by performing data demodulation for the received data symbols, and provides the data symbol estimation values to the Rx data processor 150. The Rx data processor 50 demodulates (i.e., symbol de-mapping), deinterleaves, and decodes the data symbol estimation values to recover the transmitted traffic data.

Processing based on the symbol demodulator 145 and the Rx data processor 150 is complementary to processing based on the symbol demodulator 120 and the Tx data processor 115 at the base station 105.

On an uplink, the Tx data processor 165 of the user equipment 110 processes traffic data and provides data symbols. The symbol modulator 170 receives the data symbols, multiplexes the received data symbols with the pilot symbols, performs modulation for the multiplexed symbols, and provides the streams of the symbols to the transmitter 175. The transmitter 175 receives and processes the streams of the symbols and generates uplink signals. The uplink signals are transmitted to the base station 105 through the antenna 135.

The uplink signals are received in the base station 105 from the user equipment 110 through the antenna 130, and the receiver 190 processes the received uplink signals to acquire samples. Subsequently, the symbol demodulator 195 processes the samples and provides data symbol estimation values and the pilot symbols received for the uplink. The Rx data processor 197 recovers the traffic data transmitted from the user equipment 110 by processing the data symbol estimation values.

The processors 155 and 180 of the user equipment 110 and the base station 105 respectively command (for example, control, adjust, manage, etc.) the operation at the user equipment 110 and the base station 105. The processors 155 and 180 may respectively be connected with the memories 160 and 185 that store program codes and data. The memories 160 and 185 respectively connected to the processor 180 store operating system, application, and general files therein.

Each of the processors 155 and 180 may be referred to as a controller, a microcontroller, a microprocessor, and a microcomputer. Meanwhile, the processors 155 and 180 may be implemented by hardware, firmware, software, or their combination. If the embodiment of the present invention is implemented by hardware, application specific integrated circuits (ASICs), digital signal processors (DSPs), digital signal processing devices (DSPDs), programmable logic devices (PLDs), and field programmable gate arrays (FPGAs) configured to perform the embodiment of the present invention may be provided in the processors 155 and 180.

Meanwhile, if the embodiment according to the present invention is implemented by firmware or software, firmware or software may be configured to include a module, a procedure, or a function, which performs functions or operations of the present invention. Firmware or software configured to perform the present invention may be provided in the processors 155 and 180, or may be stored in the memories 160 and 185 and driven by the processors 155 and 180.

Layers of a radio interface protocol between the user equipment 110 or the base station 105 and a wireless communication system (network) may be classified into a first layer L1, a second layer L2 and a third layer L3 on the basis of three lower layers of OSI (open system interconnection) standard model widely known in communication systems. A physical layer belongs to the first layer L1 and provides an information transfer service using a physical channel. A radio resource control (RRC) layer belongs to the third layer and provides control radio resources between the user equipment and the network. The user equipment and the base station may exchange RRC messages with each another through the RRC layer.

Figure 2:
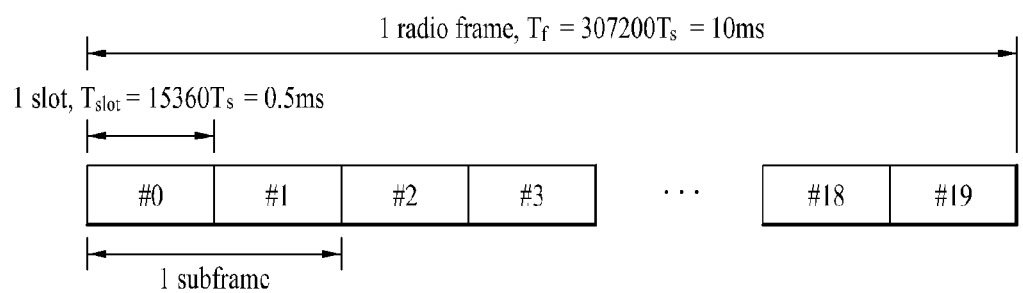
FIG. 2 is a diagram illustrating a structure of a radio frame used in a 3GPP LTE system which is an example of a mobile communication system.

FIG. 2 is a diagram illustrating a structure of a radio frame used in a 3GPP LTE system which is an example of a mobile communication system.

Referring to FIG. 2, one radio frame has a length of 10 ms ($327200 \times T_s$) and includes ten (10) subframes of an equal size. Each sub frame has a length of 1 ms and includes two slots. Each slot has a length of 0.5 ms ($15360T_s$). In this case, $T_s$ represents a sampling time, and is expressed by $T_s=1/(15 kHz \times 2048)=3.2552 \times 10^{-8}$ (about 33 ns). The slot includes a plurality of orthogonal frequency division multiplexing (OFDM) symbols or single carrier-frequency division multiple access (SC-FDMA) symbols in a time domain, and includes a plurality of resource blocks (RBs) in a frequency domain.

In the LTE system, one resource block includes twelve (12) subcarriers×seven (or six) OFDM symbols or SC-FDMA symbols. A transmission time interval (TTI), which is a transmission unit time of data, may be determined in a unit of one or more subframes. The aforementioned structure of the radio frame is only exemplary, and various modifications may be made in the number of subframes included in the radio frame or the number of slots included in the subframe, or the number of OFDM symbols or SC-FDMA symbols included in the slot.

Figure 3:
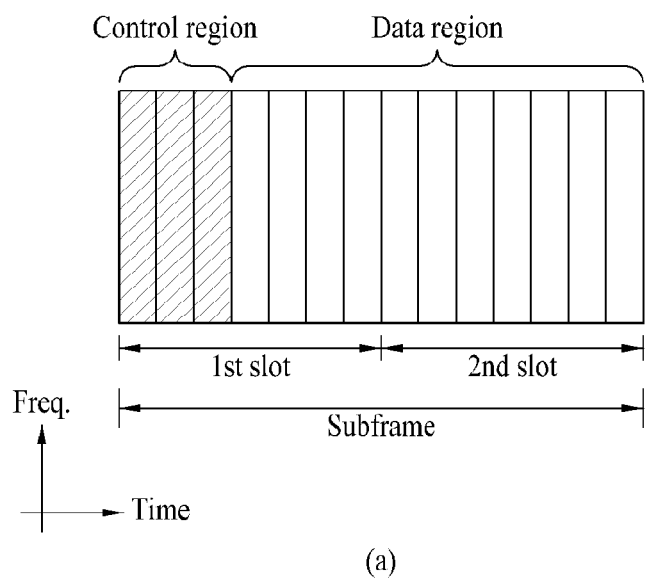
FIG. 3 is a diagram illustrating structures of downlink and uplink subframes in a 3GPP LTE system which is an example of a mobile communication system.
Figure 3:
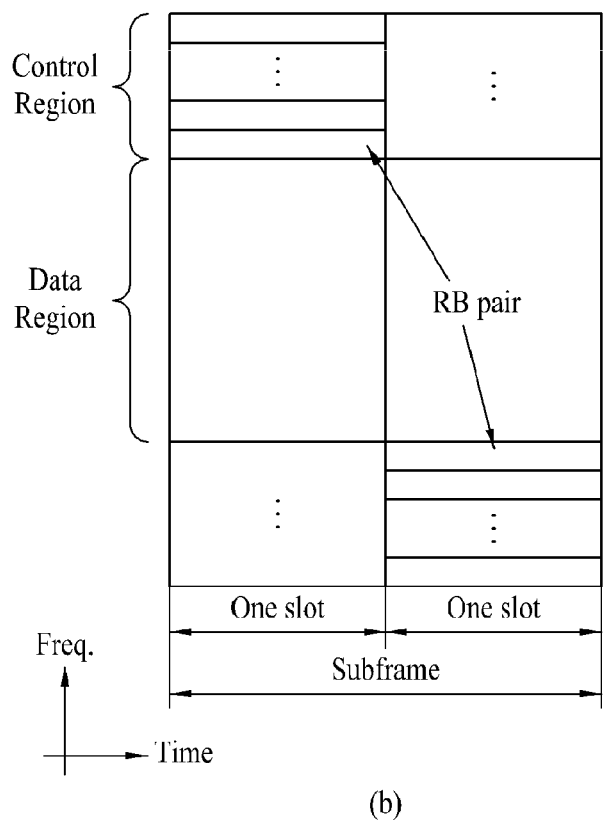

FIG. 3 is a diagram illustrating structures of downlink and uplink subframes in a 3GPP LTE system which is an example of a mobile communication system.

Referring to (a) of FIG. 3, one downlink subframe includes two slots in a time domain. Maximum three OFDM symbols located at the front of the first slot within one downlink subframe correspond to a control region to which control channels are allocated. The other OFDM symbols correspond to a data region to which a physical downlink shared channel (PDSCH) is allocated.

Examples of downlink control channels used in the 3GPP LTE system include a Physical Control Format Indicator Channel (PCFICH), a Physical Downlink Control Channel (PDCCH), and a Physical Hybrid ARQ Indicator Channel (PHICH). The PCFICH transmitted from the first OFDM symbol of the subframe carries information on the number (that is, size of control region) of OFDM symbols used for transmission of the control channels within the subframe. The control information transmitted through the PDCCH will be referred to as downlink control information (DCI). The DCI includes uplink resource allocation information, downlink resource allocation information, and uplink transmission (Tx) power control command for random user equipment groups. The PHICH carries ACK/NACK (acknowledgement/negative-acknowledgement) signals in response to uplink HARQ (Hybrid Automatic Repeat Request). In other words, the ACK/NACK signal for the uplink data transmitted from the user equipment is transmitted on the PHICH.

Now, the PDCCH will be described.

The base station may transmit a resource allocation and transport format (this may be referred to as DL grant) of the PDSCH, resource allocation information (this may be referred to as UL grant) of the PUSCH, aggregation of transmission power control commands for individual user equipment within a random user equipment group, and activity information of voice over Internet protocol (VoIP) through the PDCCH. A plurality of PDCCHs may be transmitted within the control region. The user equipment may monitor the plurality of PDCCHs. The PDCCH is configured by aggregation of one or a plurality of continuous control channel elements (CCEs). The PDCCH of one or aggregation of several continuous CCEs may be transmitted through the control region after subblock interleaving. The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the correlation between the number of CCEs and a coding rate provided by the CCEs.

The control information transmitted through the PDCCH is referred to as downlink control information (DCI). The following Table 1 illustrates DCI based on a DCI format.

TABLE 1

| DCI Format | Description |
|---|---|
| DCI format 0 | used for the scheduling of PUSCH |
| DCI format 1 | used for the scheduling of one PDSCH codeword |
| DCI format 1A | used for the compact scheduling of one PDSCH codeword and random access procedure initiated by a PDCCH order |
| DCI format 1B | used for the compact scheduling of one PDSCH codeword with precoding information |
| DCI format 1C | used for very compact scheduling of one PDSCH codeword |
| DCI format 1D | used for the compact scheduling of one PDSCH codeword with precoding and power offset information |
| DCI format 2 | used for scheduling PDSCH to UEs configured in closed-loop spatial multiplexing mode |
| DCI format 2A | used for scheduling PDSCH to UEs configured in open-loop spatial multiplexing mode |
| DCI format 3 | used for the transmission of TPC commands for PUCCH and PUSCH with 2-bit power adjustments |
| DCI format 3A | used for the transmission of TPC commands for PUCCH and PUSCH with single bit power adjustments |

The DCI format 0 represents uplink resource allocation information, the DCI formats 1 and 2 represent downlink resource allocation information, and the DCI formats 3 and 3A represent uplink transmit power control (TPC) command for random user equipment groups.

A method for mapping a resource for PDCCH transmission in a base station of the LTE system will be described in brief.

Generally, the base station may transmit scheduling allocation information and other control information through the PDCCH. The physical control channel may be transmitted to one aggregation or a plurality of continuous control channel elements (CCEs). One CCE includes nine resource element groups (REGs). The number of resource element groups (RBGs) which are not allocated to a physical control format indicator channel (PCFICH) or a physical hybrid automatic repeat request indicator channel (PHICH) is $N_{REG}$. The CCEs available in the system are from 0 to $N_{CCE}-1$ (in this case, $N_{CCE}=\lfloor N_{REG}/9 \rfloor$). The PDCCH supports multiple formats as expressed in Table 2 below. One PDCCH that includes n continuous CCEs starts from CCE that performs i mod n=0 (in this case, i is a CCE number). The multiple PDCCHs may be transmitted to one subframe.

TABLE 2

| PDCCH format | Number of CCEs | Number of resource-element groups | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

Referring to Table 2, the base station may determine a PDCCH format depending on how many regions control information are transmitted. The user equipment may reduce overhead by reading out control information in a unit of CCE. Likewise, the relay node may read out the control information in a unit of CCE. In the LTE-A system, a resource element (RE) may be mapped in a unit of relay-control channel element (R-CCE) to transmit R-PDCCH for a random relay node.

Referring to (b) of FIG. 3, the uplink subframe may be divided into a control region and a data region on a frequency domain. A physical uplink control channel (PUCCH), which carries uplink control information, is allocated to the control region. A physical uplink shared channel (PUSCH), which carries user data, is allocated to the data region. In order to maintain single carrier features, one user equipment does not transmit the PUCCH and the PUSCH at the same time. The PUCCH for one user equipment is allocated to resource block (RB) pair at one subframe. Resource blocks (RBs) belonging to the RB pair occupy different subcarriers for two slots. The RB pair allocated to the PUCCH is subjected to frequency hopping at a slot boundary.

Figure 4:
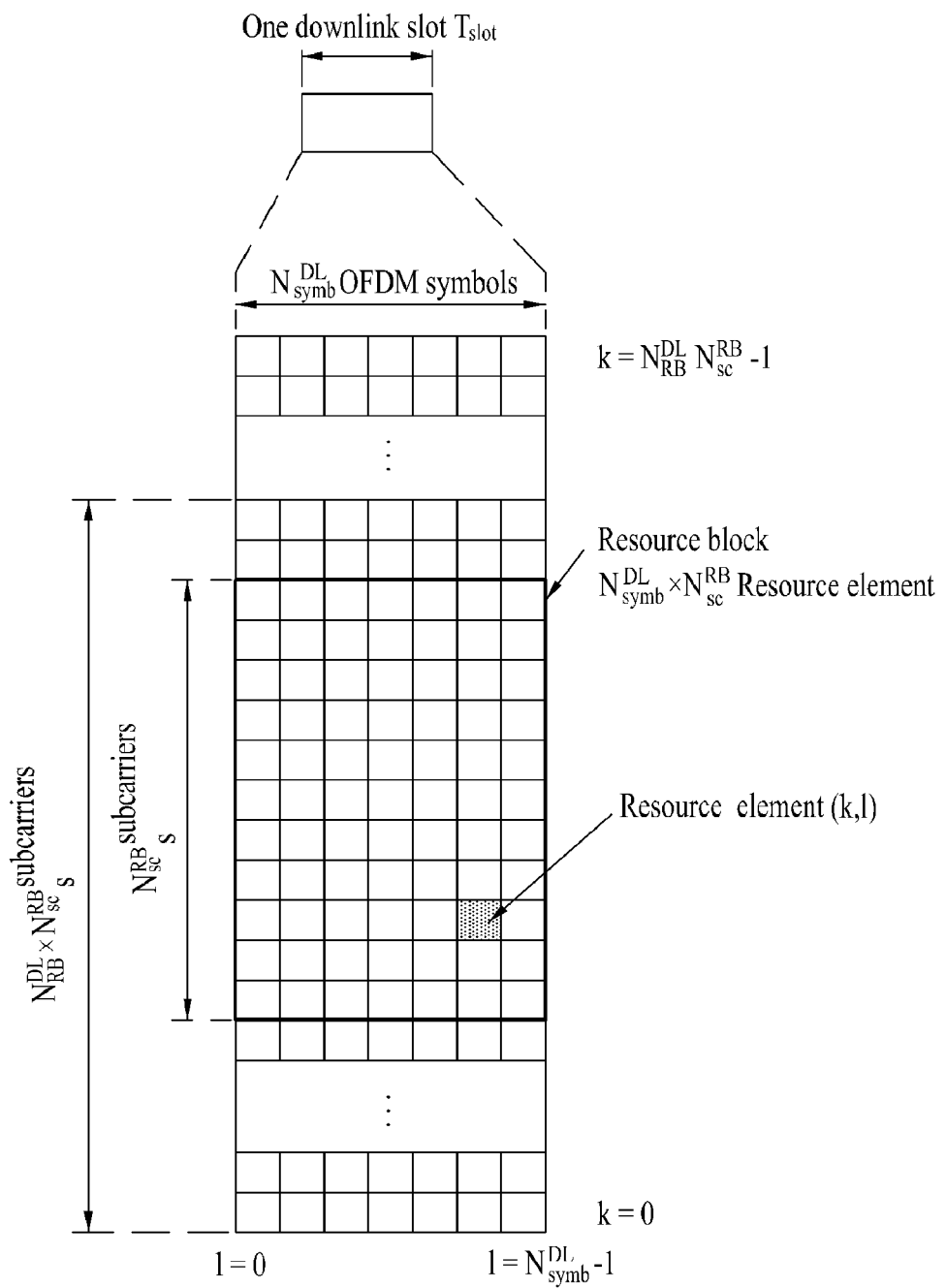
FIG. 4 is a diagram illustrating a time-frequency resource grid structure of a downlink used in the present invention.

FIG. 4 is a diagram illustrating a time-frequency resource grid structure of a downlink slot used in the present invention.

A downlink signal transmitted from each slot may be expressed by a resource grid, which includes $N_{RB}^{DL} \times N_{sc}^{RB}$ number of subcarriers and $N_{symb}^{DL}$ number of OFDM (orthogonal frequency division multiplexing) symbols. In this case, $N_{RB}^{DL}$ represents the number of resource blocks (RBs) in the downlink, $N_{sc}^{RB}$ represents the number of subcarriers that constitute one resource block (RB), and $N_{symb}^{DL}$ represents the number of OFDM symbols at one downlink slot. The size of $N_{RB}^{DL}$ may be varied depending on a downlink transmission bandwidth configured within a cell and should satisfy $N_{RB}^{min,DL} \leq N_{RB}^{DL} \leq N_{RB}^{max,DL}$. In this case, $N_{RB}^{min,DL}$ is the smallest downlink bandwidth supported by the wireless communication system, and $N_{RB}^{max,DL}$ is the greatest downlink bandwidth supported by the wireless communication system. Although $N_{RB}^{min,DL}=6$ and $N_{RB}^{max,DL}=110$ may be provided, the present invention is not limited to this example. The number of OFDM symbols included in one slot may be varied depending on a length of cyclic prefix (CP) and interval of the subcarriers. In case of MIMO antenna transmission, one resource grid may be defined per one antenna port.

Each element within the resource grid for each antenna port is referred to as a resource element (RE), and is uniquely identified by a pair of indexes (k,l) within the slot. In this case, k is an index in the frequency domain, l is an index in the time domain. Also, k has any one value of 0, . . . , $N_{RB}^{DL}N_{sc}^{RB}-1$, and l has any one value of 0, . . . , $N_{symb}^{DL}-1$.

The resource block shown in FIG. 4 is used to describe the mapping relation between a physical channel and resource elements. The RB may be divided into a physical resource block (PRB) and a virtual resource block (VRB). The one physical resource block is defined by $N_{symb}^{DL}$ continuous OFDM symbols in the time domain and $N_{sc}^{RB}$ continuous subcarriers in the frequency domain. In this case, $N_{symb}^{DL}$ and $N_{sc}^{RB}$ may be the values previously defined. For example, $N_{symb}^{DL}$ and $N_{sc}^{RB}$ may be given as illustrated in Table 3 below. Accordingly, one PRB includes $N_{symb}^{DL} \times N_{sc}^{RB}$ number of resource elements. One PRB corresponds to, but not limited to, one slot in the time domain, and corresponds to, but not limited to, 180 kHz in the frequency domain.

TABLE 3

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The PRB has values from 0 to $N_{RB}^{DL}-1$ in the frequency domain. The relation between the physical resource block number $n_{PRB}$ and resource elements (k,l) within one slot satisfies $$n_{PRB} = \left\lfloor \frac{k}{N_{sc}^{RB}} \right\rfloor.$$

The virtual resource block (VRB) has the same size as that of the physical resource block (PRB). The VRB may be divided into a localized virtual resource block (LVRB) and a distributed virtual resource blocks (DVRB). For each VRB, a pair of VRBs in two slots within one subframe are allocated together with a single virtual resource block number $n_{VRB}$.

The VRB may have the same size as that of the PRB. Two types of VRBs are defined, wherein the first type is the localized VRB (LVRB) and the second type is the distributed VRB (DVRB). For each VRB, a pair of VRBs are allocated to two slots of one subframe together with a single VRB index (hereinafter, referred to as VRB number). In other words, $N_{RB}^{DL}$ number of VRBs belonging to the first slot of two slots constituting one subframe are allocated with any one index of 0 to $N_{RB}^{DL}-1$, $N_{RB}^{DL}$ number of VRBs belonging to the second slot are allocated with any one index of 0 to $N_{RB}^{DL}-1$.

Hereinafter, a procedure of transmitting a PDCCH from a base station to a user equipment in an LTE system will be described. The base station determines a PDCCH format depending on the DCI transmitted to the user equipment, and attaches cyclic redundancy check (CRC) to the control information. The CRC is masked with a unique identifier (for example, radio network temporary identifier (RNTI)) depending on owner of the PDCCH or usage of the PDCCH. If the PDCCH is for a specific user equipment, cell-RNTI (C-RNTI) of the corresponding user equipment may be masked with the CRC. If the PDCCH is for a paging message, a paging indicator identifier (P-RNTI) may be masked with the CRC. If the PDCCH is for system information, system information identifier and system information RNTI (SI-RNTI) may be masked with the CRC. In order to indicate a random access response which is the response to transmission of random access preamble of the user equipment, a random access RNTI (RA-RNTI) may be masked with the CRC. The following Table illustrates an example of identifiers masked with the PDCCH and/or R-PDCCH.

TABLE 4

| Type | Identifier | Description |
| --- | --- | --- |
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe, or PRACH slot index for UE PRACH transmission). |
|  | TPC-RNTI | used for uplink transmit power control command (It could be differentiated according to the index of UE TPC group). |

If the C-RNTI is used, the PDCCH carries control information for the corresponding specific user equipment. If another RNTI is used, the PDCCH carries common control information received by all user equipment or a plurality of user equipment within the cell. The base station generates coded data by performing channel coding for the DCI to which CRC is added. And, the base station performs rate matching based on the number of CCEs allocated to PDCCH, R-PDCCH format. Afterwards, the base station generates modulation symbols by modulating the coded data, and maps the modulation symbols into physical resource elements.

As described above, the base station transmits resource allocation information (UL grant) of the PUSCH to the user equipment through the PDCCH. Then, the user equipment may transmit uplink data to the base station through the PUSCH scheduled from the base station. The scheduled PUSCH corresponds to a non-contention based uplink data channel.

However, the user equipment needs to transmit data through a contention based physical uplink data channel before being scheduled for uplink data transmission from the base station. Accordingly, a method for contention based data transmission of an LTE-A user equipment will be described. In particular, a new channel for contention based uplink data transmission will be defined and referred to as a contention based physical uplink shared channel (C-PUSCH). However, the contention based physical uplink data channel may be referred to as another channel as well as C-PUSCH.

First of all, a method for allocating a C-PUSCH from a base station to a user equipment, a method for C-PUSCH transmission of a user equipment and a procedure of a base station and a user equipment for the method will be defined.

The base station may allocate a specific region on a frequency and time axis to support C-PUSCH transmission of the user equipment and notify the user equipment of the specific region. The base station may transmit corresponding C-PUSCH configuration information to each user equipment through cell-specific RRC signaling or UE-specific RRC signaling.

The base station may allocate the C-PUSCH in a physical resource block (PRB) unit on a frequency axis. A bitmap mode may be used for PRB allocation for C-PUSCH of the base station. For example, the base station may notify the user equipment of C-PUSCH channel allocation for all uplink PRB indexes through bitmap indication by allocating 1 bit to one PRB, or may notify the user equipment of C-PUSCH channel allocation in a unit of RBG through bitmap indication by allocating 1 bit to one resource block group (RBG) that includes two or more PRBs. At this time, the number of PRBs constituting one RBG may be allocated semi-statically through cell-specific RRC signaling of the base station during C-PUSCH configuration, or may be defined implicitly in accordance with an uplink bandwidth so that the user equipment may know the number of PRBs constituting one RBG.

As another method, the base station may allocate PRBs for C-PUSCH continuously. In this case, the base station may notify the user equipment of frequency size (for example, the number of PRBs) of the C-PUSCH and PRB index corresponding to a start point of the C-PUSCH, or may notify the user equipment of PRB index of the start point and PRB index of the end point.

As still another method, the base station may allocate C-PUSCH to a band edge except for PUCCH within one uplink component carrier. In this case, the C-PUSCH may be allocated as illustrated in FIG. 5 in accordance with the presence of PUCCH of the corresponding uplink component carrier.

Figure 5:
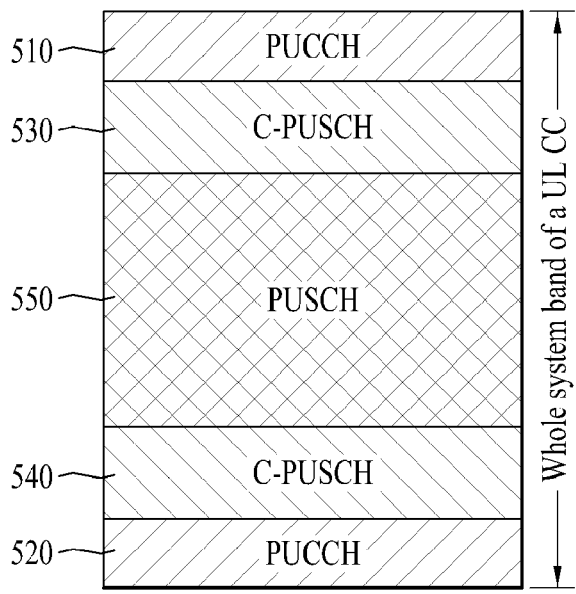
FIG. 5 is a diagram conceptionally illustrating an example of C-PUSCH allocation.
Figure 5:
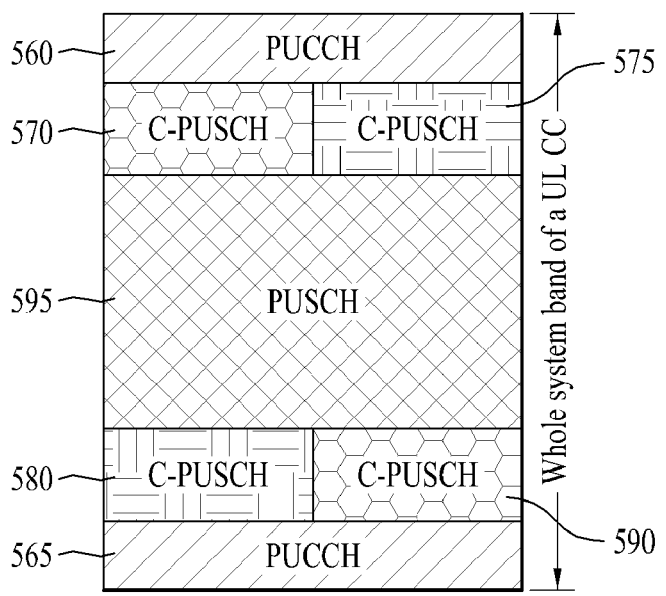

FIG. 5 is a diagram conceptually illustrating an example of C-PUSCH allocation.

Referring to (a) of FIG. 5, PUCCH 510, 520, C-PUSCH 530, 540, and PUSCH 530 may be allocated to a full system band of one uplink component carrier. The PUCCH 510, 520 may be allocated to both edge regions of the full system band. The C-PUSCH 530, 540 may newly be defined and allocated as a new channel. The base station may signal frequency size only (for example, the number of PRBs) to the user equipment.

Referring to (b) of FIG. 5, PUCCH 560, 565, C-PUSCH 570, 575, 580, 590 and PUSCH 595 may be allocated to a full system band of one uplink component carrier. Unlike the structure illustrated in (a) of FIG. 5, the base station may support slot hopping for C-PUSCH transmission of the user equipment. In other words, data corresponding to the C-PUSCH 570, 575, 580 and 590 may be transmitted in a type of frequency hopping of a slot unit as illustrated in (b) of FIG. 5. In this case, if a random user equipment performs PUSCH transmission through a corresponding C-PUSCH, PUSCH slot hopping structure may be disregarded and slot hopping may be performed in accordance with a slot hopping structure of the C-PUSCH.

In this way, the user equipment may transmit data to the base station through the C-PUSCH by using a slot hopping system where C-PUSCHs 570 and 590 are used in pairs. The base station may notify the user equipment of allocation information on a cell-commonly set frequency axis of the C-PUSCH through cell-specific RRC signaling, or may notify the user equipment allocation information on a UE-specifically set frequency axis of the C-PUSCH through UE-specific RRC signaling.

The base station may notify the user equipment of C-PUSCH allocation information on a time axis together with C-PUSCH allocation information on a frequency axis. To this end, the base station may make a C-PUSCH configuration table similarly to PRACH configuration and allocate the C-PUSCH to the user equipment on the basis of the made table. Alternatively, the base station may directly signal a period of the C-PUSCH to the user equipment. The base station may set duration information on the time axis of the C-PUSCH UE-specifically. In this case, the base station may notify the user equipment of duration information on the time axis of the C-PUSCH through UE-specific RRC signaling. Alternatively, the base station may notify the user equipment of duration information on the time axis of the C-PUSCH through cell-specific RRC signaling by setting a cell-common value.

In this way, C-PUSCH configuration may include C-PUSCH region configuration information on the frequency axis and C-PUSCH duration configuration information on the time axis in two-phase configuration. In this case, the base station may transmit the C-PUSCH region configuration information on the frequency axis and the C-PUSCH duration information on the time axis to the user equipment through the same signaling or separate signaling. If the base station transmits the C-PUSCH region configuration information and the C-PUSCH duration information through separate signaling, it may transmit C-PUSCH region information cell commonly set on the frequency axis to the user equipment through cell-specific RRC signaling, and may transmit C-PUSCH duration information set UE specifically on the time axis to the user equipment thorough UE-specific RRC signaling.

By contrast, the base station may transmit C-PUSCH region information UE specifically set on the frequency axis to the user equipment through UE-specific RRC signaling, and may transmit C-PUSCH duration information cell commonly set on the time axis to the user equipment through cell-specific RRC signaling.

As further still another method, the base station may perform grouping of user equipment within a cell to obtain C-PUSCH configuration commonly within a user equipment group but may obtain group-specific C-PUSCH configuration for specific C-PUSCH configuration for each group. In this case, the base station may transmit user equipment grouping information to the corresponding group through UE-specific RRC signaling or may indicate a group to which each user equipment belongs.

The method for allocating a C-PUSCH from a base station and the method for signaling information on a frequency axis and a time axis to which C-PUSCH is allocated have been described until now. Hereinafter, a procedure of a user equipment and a base station for transmission and reception of data through C-PUSCH will be described.

The user equipment may transmit data to the base station through the C-PUSCH. In particular, the user equipment may transmit data to the base station through the C-PUSCH set semi-statically by the base station. To this end, the user equipment may randomly select and transmit one of basis units of C-PUSCH transmission constituting the nearest C-PUSCH (timely fast). In this case, the basic unit of C-PUSCH transmission of the user equipment may be defined C-PUSCH transmission opportunity. One C-PUSCH may include one or more C-PUSCH transmission opportunities. The user equipment may select one of C-PUSCH transmission opportunities constituting C-PUSCH during C-PUSCH transmission and transmit data to the base station through the selected C-PUSCH transmission opportunity.

In this case, the size of the C-PUSCH transmission opportunity may be determined as follows. For example, one physical resource block (PRB) of the frequency axis and one slot (0.5 ms) of the time axis may be set as unit C-PUSCH transmission opportunity. In this case, supposing that the size (that is, the number of PRBs) of the C-PUSCH of one subframe on the frequency axis is N, N is respectively included in the first slot and the second slot, whereby the C-PUSCH of one subframe may include a total of two N C-PUSCH transmission opportunities. For another example, one PRB on the frequency axis and one subframe (1 ms) on the time axis may be set to unit C-PUSCH transmission opportunity. In this case, supposing that the size (that is, the number of PRBs) on the frequency axis is N, the C-PUSCH of one subframe may include a total of N C-PUSCH transmission opportunities.

As another method, if uplink data packet (that is, C-PUSCH transmission packet) is transmitted from the upper layer, the user equipment may randomly select and transmit one of all C-PUSCH transmission opportunities constituting C-PUSCHs allocated for a certain time duration (for example, 2 ms or 4 ms). In other words, a window for C-PUSCH transmission is introduced, whereby the user equipment may select and transmit one of C-PUSCH transmission opportunities of all C-PUSCHs belonging to the corresponding window. At this time, since the corresponding C-PUSCH transmission window size may be fixed implicitly, the user equipment may know the corresponding C-PUSCH transmission window size implicitly, or through UE-specific signaling or cell-specific RRC signaling. Alternatively, if the C-PUSCH transmission packet is transmitted from the upper layer, the user equipment may randomly select one of C-PUSCH transmission opportunities constituting C-PUSCHs after random backoff and transmit data to the base station through the selected C-PUSCH transmission opportunity.

Figure 6:
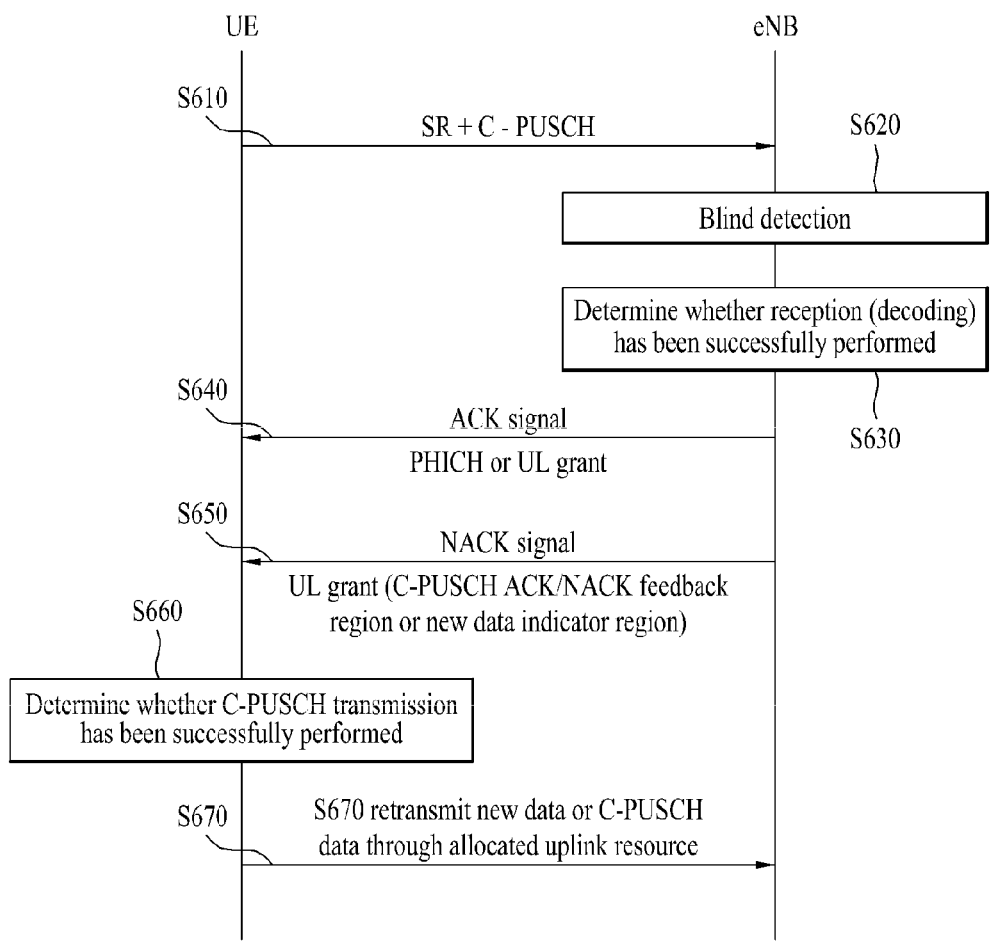
FIG. 6 is a diagram illustrating an example of a procedure of C-PUSCH transmission and response to the C-PUSCH transmission between a user equipment and a base station.

FIG. 6 is a diagram illustrating an example of a procedure of C-PUSCH transmission and response to the C-PUSCH transmission between a user equipment and a base station.

Referring to FIG. 6, the user equipment may transmit scheduling request information through a scheduling request channel together with C-PUSCH transmission. To this end, one of two options, as follows, may be used.

As the first option, if an uplink data packet is transmitted from the upper layer, the user equipment may simultaneously transmit a scheduling request (SR) and C-PUSCH to the base station through the same subframe (S610). The base station may perform decoding for receiving C-PUSCH information transmitted through the corresponding C-PUSCH (S620). The base station may perform blinding detection for detecting whether data transmitted from one or more user equipment, which have transmitted the scheduling request information, through one or more contention based physical uplink data channels exist per data transmission unit (that is, C-PUSCH transmission opportunity) previously defined (S620). In this specification, the scheduling request channel through which the user equipment transmits the scheduling request information may be a separate channel specifically allocated to each user equipment.

As the second option, although not shown in FIG. 6, if an uplink data packet is transmitted from the upper layer, after transmitting a scheduling request signal to the base station through the scheduling request channel, the user equipment may transmit data (C-PUSCH signal) to the base station through the C-PUSCH located in the Kth subframe (in this case, K≥1 and K is an integer). In this case, the value of K may be fixed implicitly, whereby the user equipment may know the value of K (for example, implicitly set as K=4 for all user equipment), or the base station may notify the user equipment of the value determined as a cell common value through cell-specific RRC signaling. Alternatively, the value of K may have a UE-specific value. In this case, the base station may notify the user equipment of the value through UE-specific RRC signaling. Unlike this, the value of K may be determined in accordance with a period of the C-PUSCH. For example, the value of K may be set to have the same value as the period of the C-PUSCH.

As described above, the base station may simultaneously or sequentially receive data through the contention based physical uplink data channel and scheduling request information through the scheduling request channel from one or more user equipment (S610). After receiving the scheduling request signal from the user equipment, the base station may perform blind detection per all C-PUSCH transmission opportunities that may allow the user equipment, which has transmitted the scheduling request signal, to transmit the corresponding C-PUSCH signal in accordance with the aforementioned C-PUSCH transmission mode (S620).

Afterwards, if the base station successfully receives (decodes) C-PUSCH message (for example, uplink data packet through C-PUSCH) from the corresponding user equipment which has transmitted the scheduling request signal (S630), it may transmit ACK signal to the corresponding user equipment through a PHICH mapped implicitly in accordance with PRB index where C-PUSCH transmission occurs and a cyclic shift value of a demodulation reference signal (DM RS) of the user equipment or mapped in accordance with a previously defined rule (S640). Alternatively, the base station may notify the user equipment ACK signal implicitly by skipping ACK/NACK feedback through the PHICH and toggling a new data indicator region (or field) of uplink (UL) grant (S640). In this case, the new data indicator may be 1 bit size, and may indicate ACK signal by being toggled.

The PHICH is a channel for transmitting HARQ ACK/NACK from the base station in response to uplink transmission of the user equipment. A plurality of PHICHs may be mapped into the same resource element (RE) in accordance with a code division multiplexing (CDM) mode. The base station may multiplex HARQ ACK/NACK in accordance with the code division multiplexing mode in response to the response to data transmission of a plurality of user equipment through the C-PUSCH and transmit the same through the PHICH.

By contrast, if the base station fails to successfully receive (decode) C-PUSCH message from the corresponding user equipment which has transmitted the scheduling request signal (S630), it may transmit NACK signal for C-PUSCH transmission data to the corresponding user equipment through UL grant (S640). To this end, the base station may notify the user equipment of NACK signal for ACK/NACK feedback of C-PUSCH transmission implicitly through C-PUSCH ACK/NACK feedback region (or field) newly defined within the UL grant message or new data indicator region (or field) within the UL grant.

The user equipment may determine whether the C-PUSCH transmission has been performed successfully on the basis of the signal received through the PHICH and the signal received through the new data indicator region included in the UL grant or the newly defined C-PULSCH ACK/NACK feedback region (S650). If the user equipment successfully performs C-PUSCH transmission, it may transmit new data to the base station through the allocated uplink resource. If the user equipment fails to perform C-PUSCH transmission, it retransmits C-PUSCH data to the base station through the allocated uplink resource (S660).

Before the user equipment starts C-PUSCH transmission, the base station may transmit a cyclic shift value of a reference signal for demodulation (for example, DM RS) to each user equipment through UE-specific RRC signaling. Alternatively, the base station may define a rule of a cyclic shift value implicitly mapped in accordance with C-RNTI of the user equipment and transmit the rule to the user equipment, whereby the user equipment may know the cyclic shift value mapped implicitly. The user equipment may perform C-PUSCH transmission by using the cyclic shift value of the DM RS allocated through separate signaling from the base station or the implicitly known cyclic shift value.

As described above, the base station may newly define UE-specific C-PUSCH configuration message for C-PUSCH transmission of the user equipment. To this end, the base station may include UE-specific information or group-specific information of various kinds of C-PUSCH configuration information in a response message (msg 4) to RRC connection request message of the user equipment during an initial access step. Alternatively, the base station may define RRC message for transmission of UE-specific information of C-PUSCH configuration information. Accordingly, the base station may transmit UE-specific information (for example, cyclic shift value of DM RS, C-PUSCH transmission window size, and value of K (K may mean a subframe interval from the subframe for which the user equipment has transmitted scheduling request information to the subframe for which data are transmitted through C-PUSCH)).

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is also obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The method for transmitting and receiving data through a contention based physical uplink data channel and the apparatus for the same may be used industrially in wireless communication systems such as 3GPP LTE-A system and IEEE 802 system.

The invention claimed is:
1. A method for receiving data by a base station (BS) through a contention based physical uplink data channel, the method comprising:
    receiving, by the BS from one or more user equipment, data through the contention based physical uplink data channel and scheduling request information through a sched- uling request channel, the scheduling request channel being separately allocated to each of the one or more user equipment;

decoding, by the BS, the received data; and if the received data are successfully decoded, transmitting, through an uplink grant message including uplink resource allocation information or through a physical hybrid-ARQ indicator channel (PHICH), an ACK signal to the one or more user equipment which transmitted the scheduling request information, wherein a position of a resource to which the PHICH is mapped is determined based on at least one of a cyclic shift value of a demodulation reference signal included in the contention based physical uplink data channel, or a physical resource block (PRB) index of the contention based physical uplink data channel.

2. The method according to claim 1, further comprising: performing blind detection per a predefined data transmission unit of the data.

3. The method according to claim 1, wherein the contention based physical uplink data channel includes a plurality of data transmission units.

4. The method according to claim 1, wherein the ACK signal is transmitted through a specific indicator or a field within the uplink grant message.

5. The method according to claim 4, wherein the ACK signal or a NACK signal is indicated by toggling of the specific indicator.

6. The method according to claim 1, wherein the contention based uplink data channel is a channel where frequency hopping is performed in a slot unit.

7. A method for transmitting data by a user equipment (UE) through a contention based physical uplink data channel, the method comprising:

transmitting, by the UE to a base station (BS), data through the contention based physical uplink data channel and scheduling request information through a scheduling request channel, the scheduling request channel being separately allocated to the user equipment; and receiving, by the UE from the BS, an ACK signal or a NACK signal through a physical hybrid-ARQ indicator channel (PHICH) or through an uplink grant message, the ACK signal or the NACK signal indicating whether the data have been successfully decoded, wherein the ACK signal or the NACK signal is received through a specific indicator or a field within the uplink grant (UL grant) message, and wherein a position of a resource to which the PHICH is mapped is determined based on at least one of a cyclic shift value of a demodulation reference signal included in the contention based physical uplink data channel, or a physical resource block (PRB) index of the contention based physical uplink data channel.

8. The method according to claim 7, wherein the ACK signal or the NACK signal is indicated by toggling of the specific indicator.

9. The method according to claim 7, wherein the contention based uplink data channel is a channel where frequency hopping is performed in a slot unit.

10. A base station apparatus for receiving data through a contention based physical uplink data channel, the base station apparatus comprising:

a receiver;

a transmitter; and a processor operatively connected to the receiver and the transmitter, the processor configured to receive, from one or more user equipment, data through the contention based physical uplink data channel and scheduling request information through a scheduling request channel, the scheduling request channel being separately allocated to each of the one or more user equipment;

decode the received data and if the received data are successfully decoded, transmit, through an uplink grant message including uplink resource allocation information or through a physical hybrid-ARQ indicator channel (PHICH), an ACK signal to the one or more user equipment which transmitted the scheduling request information, wherein a position of a resource to which the PHICH is mapped is determined based on at least one of a cyclic shift value of a demodulation reference signal included in the contention based physical uplink data channel, or a physical resource block (PRB) index of the contention based physical uplink data channel.

11. The base station apparatus according to claim 10, wherein the processor is further configured to perform blind detection per a predefined data transmission unit of the data.

12. A user equipment apparatus for transmitting data through a contention based physical uplink data channel, the user equipment comprising:

a transmitter;

a receiver; and a processor operatively connected to the receiver and the transmitter, the processor configured to transmit, to a base station (BS), data through the contention based physical uplink data channel and scheduling request information through a scheduling request channel, the scheduling request channel being separately allocated to the user equipment; and receiving, from the BS, an ACK signal or a NACK signal through a physical hybrid-ARQ indicator channel (PHICH) or through an uplink grant message, the ACK signal or the NACK signal indicating whether the data have been successfully decoded, wherein the ACK signal is received through a specific indicator or a field within the uplink grant (UL grant) message, and wherein a position of a resource to which the PHICH is mapped is determined based on at least one of a cyclic shift value of a demodulation reference signal included in the contention based physical uplink data channel, or a physical resource block (PRB) index of the contention based physical uplink data channel.

* * * * *